US008975343B2

(12) United States Patent
Marks et al.

(10) Patent No.: US 8,975,343 B2
(45) Date of Patent: Mar. 10, 2015

(54) HYDROXYL-FUNCTIONAL POLYESTER RESINS

(75) Inventors: Maurice J. Marks, Lake Jackson, TX (US); Xin Jin, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 70 days.

(21) Appl. No.: 13/508,075

(22) PCT Filed: Nov. 10, 2010

(86) PCT No.: PCT/US2010/056214

§ 371 (c)(1), (2), (4) Date: May 4, 2012

(87) PCT Pub. No.: WO2011/071650

PCT Pub. Date: Jun. 16, 2011

(65) Prior Publication Data

US 2012/0220750 A1 Aug. 30, 2012

Related U.S. Application Data

(60) Provisional application No. 61/267,672, filed on Dec. 8, 2009.

(51) Int. Cl.
*C08G 65/32* (2006.01)
*C08G 63/42* (2006.01)

(52) U.S. Cl.
CPC .................................... *C08G 63/42* (2013.01)
USPC ........................................................ 525/411

(58) Field of Classification Search
CPC ............................ C08L 63/00; C08L 2666/18
USPC ......................... 525/411, 412, 418, 536, 539
See application file for complete search history.

(56) References Cited

U.S. PATENT DOCUMENTS

| | | | | |
|---|---|---|---|---|
| 2,924,580 | A * | 2/1960 | Phillips et al. | 528/408 |
| 3,018,262 | A | 1/1962 | Schroeder | |
| 5,405,688 | A | 4/1995 | Decker et al. | |
| 5,780,582 | A | 7/1998 | Wang et al. | |
| 5,962,547 | A | 10/1999 | Nikolic et al. | |
| 6,153,719 | A | 11/2000 | Abbey et al. | |
| 6,242,083 | B1 | 6/2001 | McGrail et al. | |
| 6,572,971 | B2 | 6/2003 | Martin | |
| 6,632,893 | B2 | 10/2003 | Konarski et al. | |
| 6,887,574 | B2 | 5/2005 | Dean et al. | |
| 7,037,958 | B1 | 5/2006 | Hansen et al. | |
| 7,163,973 | B2 | 1/2007 | Ahsan | |
| 2005/0171237 | A1 | 8/2005 | Patel et al. | |
| 2006/0293172 | A1 | 12/2006 | Rubinsztajn et al. | |
| 2007/0221890 | A1 | 9/2007 | Gan | |

FOREIGN PATENT DOCUMENTS

| | | | |
|---|---|---|---|
| DE | 1227659 | | 10/1966 |
| DE | 12227659 | * | 10/1966 |
| GB | 866410 | * | 4/1961 |
| WO | 2006052727 | | 5/2006 |
| WO | 2008045882 | | 4/2008 |
| WO | 2008045884 | | 4/2008 |
| WO | 2008045889 | | 4/2008 |
| WO | 2008045894 | | 4/2008 |

OTHER PUBLICATIONS

Journal of Applied Polymer Science, John Wiley and Sons Inc. New York, US,vol. 103, No. 1, Jan. 5, 2007, pp. 462-469.
"Handbook of Epoxy Resins" Lee, H. and Neville, K. McGraw-Hill Book Company, New York, 1967, Chapter 2.
L. Matejka, et al., Curing Epoxy Resins with Anhydrides. Model Reactions and Reaction Mechanism, Journal of Polymer Science: Polymer Chemcistry Edition, vol. 21, 2873-2885.

* cited by examiner

*Primary Examiner* — Gregory Listvoyb
(74) *Attorney, Agent, or Firm* — Joe R. Prieto

(57) ABSTRACT

A hydroxyl-functional polyester resin composition including the reaction product of (a) a divinylarene dioxide, and (b) at least one dicarboxylic acid; a process for making the hydroxyl-functional polyester resin composition; and a curable hydroxyl-functional polyester resin composition made therefrom. The cured product made from the above curable hydroxyl-functional polyester resin composition is thermally stable and offers improved properties such as a lower viscosity and a high heat resistance compared to known cured products prepared from known epoxy resins.

15 Claims, No Drawings

HYDROXYL-FUNCTIONAL POLYESTER RESINS

CROSS REFERENCE TO RELATED APPLICATIONS

This is a §371 application of PCT International Patent Application Number PCT/US2010/056214 filed Nov. 10, 2010, and claims priority from provisional application Ser. No. 61/267,672, filed Dec. 8, 2009, which is incorporated herein by reference in its entirety.

BACKGROUND OF THE INVENTION

1. Field of the Invention

The present invention relates to hydroxyl-functional polyester resins; and more specifically, to epoxy ester resins and/or carboxy ester resins derived from divinylarene dioxides and dicarboxylic acids; and coatings prepared from such hydroxyl-functional polyester resins.

2. Description of Background and Related Art

Hydroxyl-functional polyester resins are well known and are typically used as a coating for food containers. For example, WO 2008045882 and WO 2008045884 describe compositions and processes for the preparation of soluble epoxy ester resins from aromatic epoxy resins and dicarboxylic acids having a low acid number. WO 2008045894 and WO 2008045889 describe compositions and processes for the preparation of soluble epoxy ester resins from aromatic epoxy resins and dicarboxylic acids having a high acid number. None of the above known processes disclose the use of divinylarene dioxides as precursors for the known processes.

Current technology related to hydroxyl-functional polyester resins sacrifices resin heat resistance when diphenols are substituted by dicarboxylic acids which, in turn, sacrifices coating heat resistance.

SUMMARY OF THE INVENTION

The present invention is directed to providing a novel hydroxyl-functional polyester resin composition prepared from a divinylarene dioxide and a dicarboxylic acid. The hydroxyl-functional polyester resin compositions of the present invention which include an epoxy ester resin and/or a carboxy ester resin derived from a divinylarene dioxide, provide a resin having improved heat resistance as determined by a higher resin glass transition temperature ($T_g$) compared to the corresponding hydroxyl-functional polyester resin prepared from bisphenol A diglycidyl ether (BADGE) and the same dicarboxylic acid.

One embodiment of the present invention is directed to a novel hydroxyl-functional polyester resin composition comprising a reaction product of (a) at least one divinylarene dioxide and (b) at least one dicarboxylic acid. Hydroxyl-functional polyester resin compositions comprising the reaction product of divinylarene dioxides and dicarboxylic acids have greater heat resistance than their BADGE analog.

Another embodiment of the present invention is directed to a curable hydroxyl-functional polyester resin composition comprising (i) the above-described hydroxyl-functional polyester resin; and (ii) at least one curing agent. Curing these resins provide coatings having good solvent resistance as determined by methyletherketone (MEK) double-rub testing.

Still other embodiments of the present invention are directed to a process for preparing the hydroxyl-functional polyester resins and the curable resin compositions described above.

DETAILED DESCRIPTION OF THE INVENTION

In its broadest scope, the present invention includes a hydroxyl-functional polyester resin comprising the reaction product of (a) a divinylarene dioxide; and (b) at least one dicarboxylic acid to provide an hydroxyl-functional polyester resin. For example, in one embodiment the novel hydroxyl-functional polyester resins of the present invention may comprise the reaction product of a divinylarene dioxide, for example a divinylbenzene dioxide (DVBDO); and a dicarboxylic acid, for example isophthalic acid. The resulting hydroxyl-functional polyester resin may be used to form a curable resin composition or formulation. The resulting curable resin composition or formulation may include one or more optional additives well known in the art.

The hydroxyl-functional polyester resin compositions comprising the reaction product of divinylarene dioxides and a dicarboxylic acid advantageously provide novel resins having higher heat resistance than their BADGE analogs. Curing these novel resins provide thermosets which maintain their high heat resistance. The hydroxyl-functional polyester resins of the present invention are suitable for the preparation of thermosets used as coatings wherein a high heat and/or solvent resistance is desirable.

In the present invention, the divinylarene dioxide such as DVBDO is prepared by reacting a divinylarene and hydrogen peroxide to provide the divinylarene dioxide useful in epoxy resin compositions of the present invention. Such prepared divinylarene dioxide may be used to prepare the hydroxyl-functional polyester resin of the present invention.

The divinylarene dioxides useful in the present invention, particularly those derived from divinylbenzene such as for example DVBDOs, are class of diepoxides which have a relatively low liquid viscosity but impart a higher heat resistance and rigidity in its derived thermosets than do conventional epoxy resins. The epoxide group in divinylarene dioxides is significantly less reactive than that in conventional glycidyl ethers used to prepare prior art hydroxyl-functional polyester resins.

The divinylarene dioxide useful in the present invention may comprise, for example, any substituted or unsubstituted arene nucleus bearing two vinyl groups in any ring position. The arene portion of the divinylarene dioxide may consist of benzene, substituted benzenes, (substituted) ring-annulated benzenes or homologously bonded (substituted) benzenes, or mixtures thereof. The divinylbenzene portion of the divinylarene dioxide may be ortho, meta, or para isomers or any mixture thereof. Additional substituents may consist of $H_2O_2$— resistant groups including saturated alkyl, aryl, halogen, nitro, isocyanate, or RO— (where R may be a saturated alkyl or aryl). Ring-annulated benzenes may consist of naphthlalene, tetrahydronaphthalene, and the like. Homologously bonded (substituted) benzenes may consist of biphenyl, diphenylether, and the like.

In one embodiment, the divinylarene dioxide used in the present invention may be produced, for example, by the process described in U.S. Patent Application Ser. No. 61/141,457, filed on Dec. 30, 2008 herewith, by Marks et al., incorporated herein by reference.

The divinylarene dioxide used for preparing the composition of the present invention may be illustrated generally by general chemical Structures I-IV as follows:

Structure I

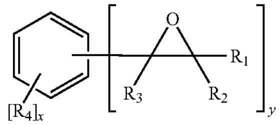

Structure II

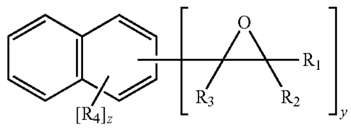

Structure III

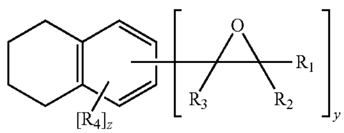

Structure IV

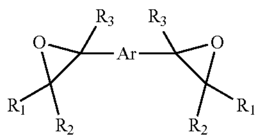

In the above Structures I, II, III, and IV of the divinylarene dioxide comonomer of the present invention, each $R_1$, $R_2$, $R_3$ and $R_4$ individually may be hydrogen, an alkyl, cycloalkyl, an aryl or an aralkyl group; or a $H_2O_2$-resistant group including for example a halogen, a nitro, an isocyanate, or an RO group, wherein R may be an alkyl, aryl or aralkyl; x may be an interger of 0 to 4; y may be an integer greater than or equal to 2; x+y may be an integer less than or equal to 6; z may be an interger of 0 to 6; z+y may be an integer less than or equal to 8; and Ar is an arene fragment including for example, 1,3-phenylene group.

In another embodiment, the divinylarene dioxide useful in the present invention may comprise, for example, divinylbenzene dioxide, divinylnaphthalene dioxide, divinylbiphenyl dioxide, divinyldiphenylether dioxide, or mixtures thereof.

In a preferred embodiment of the present invention, the divinylarene dioxide used in the epoxy resin formulation may be for example DVBDO. Most preferably, the divinylarene dioxide component that is useful in the present invention includes, for example, a DVBDO as illustrated by the following chemical formula of Structure V:

Structure V

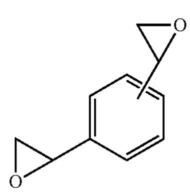

The chemical formula of the above DVBDO compound may be as follows: $C_{10}H_{10}O_2$; the molecular weight of the DVBDO is about 162.2; and the elemental analysis of the DVBDO is about: C, 74.06; H, 6.21; and O, 19.73 with an epoxide equivalent weight of about 81 g/mol.

Divinylarene dioxides, particularly those derived from divinylbenzene such as for example DVBDO, are class of diepoxides which have a relatively low liquid viscosity but a higher rigidity and crosslink density than conventional epoxy resins.

Structure VI below illustrates an embodiment of a preferred chemical structure of the DVBDO useful in the present invention:

Structure VI

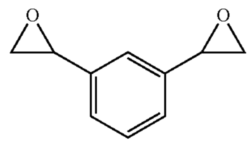

Structure VII below illustrates another embodiment of a preferred chemical structure of the DVBDO useful in the present invention:

Structure VII

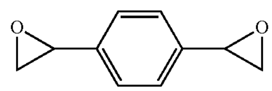

When DVBDO is prepared by the processes known in the art, it is possible to obtain one of three possible isomers: ortho, meta, and para. Accordingly, the present invention includes a DVBDO illustrated by any one of the above Structures individually or as a mixture thereof. Structures VI and VII above show the meta (1,3-DVBDO) isomer of DVBDO and the para (1,4-DVBDO) isomer of DVBDO, respectively. The ortho isomer is rare; and usually DVBDO is mostly produced generally in a range of from about 9:1 to about 1:9 ratio of meta isomer (Structure VI) to para isomer (Structure VII). The present invention preferably includes as one embodiment a range of from about 6:1 to about 1:6 ratio of Structure VI to Structure VII, and in other embodiments the ratio of Structure VI to Structure VII may be from about 4:1 to about 1:4 or from about 2:1 to about 1:2.

In another embodiment of the present invention, the divinylarene dioxide may contain quantities (such as for example less than about 20 weight percent) of substituted arenes. The amount and structure of the substituted arenes depend on the process used in the preparation of the divinylarene precursor to the divinylarene dioxide. For example, divinylbenzene (DVB) prepared by the dehydrogenation of diethylbenzene (DEB) may contain quantities of ethylvinylbenzene (EVB) and DEB. Upon reaction with hydrogen peroxide, EVB produces ethylvinylbenzene monoxide while DEB remains unchanged. The presence of these compounds can increase the epoxide equivalent weight of the divinylarene dioxide to a value greater than that of the pure compound.

In one embodiment, the divinylarene dioxide, for example DVBDO, useful in the present invention comprises a low viscosity liquid epoxy resin (LER) composition. The viscosity of the divinylarene dioxide used in the process for making the epoxy resin composition of the present invention ranges generally from about 10 mPa-s to about 100 mPa-s, preferably from about 10 mPa-s to about 50 mPa-s, and more preferably from about 10 mPa-s to about 25 mPa-s at 25° C.

Another advantageous property of the divinylarene dioxide useful in the present invention may be for example rigidity. The rigidity property of the divinylarene dioxide is measured by a calculated number of rotational degrees of freedom of the dioxide excluding side chains using the method of Bicerano described in *Prediction of Polymer Properties*, Dekker, N.Y., 1993. The rigidity of the divinylarene dioxide used in the present invention may range generally from about 6 to about 10, preferably from about 6 to about 9, and more preferably from about 6 to about 8 rotational degrees of freedom.

The concentration of the divinylarene dioxide used to prepare the hydroxyl-functional polyester resin of the present invention may range generally from about 99 weight percent (wt %) to about 1 wt %; preferably, from about 98 wt % to about 2 wt %; and more preferably, from about 95 wt % to about 5 wt %. In one embodiment, the DVBDO epoxy resin may be used in less than stoichiometric amounts when reacted with the dicarboxylic acid which results in a carboxy ester resin product. In another embodiment, a stoichiometric excess of the DVBDO epoxy resin results in an epoxy ester resin product.

The dicarboxylic acid, component (b), useful in the present invention may be any conventional acrylic acid known in the art. For example, the dicarboxylic acid compound useful in the practice of the present invention may be for example isophthalic acid, adipic acid, and the like. Mixtures of any two or more dicarboxylic acids can also be used in the practice of the present invention. Other suitable dicarboxylic acid compounds useful in the present invention are described in WO 2008/045882 A1 published Apr. 17, 2008.

Preferred examples of the dicarboxylic acid compounds useful in the present invention may include for example isophthalic acid, terephthalic acid, adipic acid; and mixtures thereof.

The concentration of the dicarboxylic acids used to prepare the hydroxyl-functional polyester resin of the present invention may range generally from about 1 wt % to about 99 wt %; preferably, from about 2 wt % to about 98 wt %; and more preferably, from about 5 wt % to about 95 wt %. As aforementioned, one embodiment of the present invention includes wherein the DVBDO epoxy resin is used in less than stoichiometric amounts when reacted with the dicarboxylic acid which results in a carboxy ester resin product. In another embodiment, a stoichiometric excess of the DVBDO epoxy resin results in an epoxy ester resin product.

In preparing the hydroxyl-functional polyester resin of the present invention, at least one unsaturated monomer may optionally be used to dissolve the dicarboxylic acid therein and facilitate the reaction between the divinylarene dioxide and the at least one dicarboxylic acid.

The preparation of the hydroxyl-functional polyester resin of the present invention is achieved by adding to a reactor: a divinylarene dioxide, a dicarboxylic acid, optionally a catalyst, and optionally a solvent; and then allowing the components to react under reaction conditions to produce the hydroxyl-functional polyester resin. The components may be mixed in any order. The components are heated until the desired degree of reaction is achieved. The resulting product is allowed to cool prior to or during isolation and is immediately usable in thermoset formulations.

The reaction conditions to form the hydroxyl-functional polyester resin include carrying out the reaction under a temperature, generally in the range of from about 100° C. to about 250° C.; preferably, from about 125° C. to about 225° C.; and more preferably, from about 150° C. to about 200° C. The pressure of the reaction may be from about 0.1 bar to about 10 bar; preferably, from about 0.5 bar to about 5 bar; and more preferably, from about 0.9 bar to about 1.1 bar.

In a preferred embodiment, one or more suitable reaction catalysts may be employed in the practice of the present invention. Catalysts used to prepare the compositions of the present invention may be selected, for example, from one or more of, an alkali metal salt, an alkaline earth metal salt, a tertiary amine, a quaternary ammonium salt, a quaternary phosphonium salt, and the like, and mixtures thereof. Preferably, the catalyst used in the present invention is ethyltriphenylphosphonium acetate-acetic acid complex or 2-phenylimidazole; or mixtures thereof.

The reaction catalyst is generally employed in an amount of from about 0.01 to about 10; preferably, from about 0.05 to about 5; and most preferably, from about 0.1 to about 4, weight percent based on the combined weight of the divinylarene dioxide compound and dicarboxylic acid compound used.

The reaction process to prepare hydroxyl-functional polyester resin of the present invention may be a batch or a continuous. The reactor used in the process may be any reactor and ancillary equipment well known to those skilled in the art.

The novel hydroxyl-functional polyester resin compositions of divinylarene dioxides and dicarboxylic acids, have a lower viscosity with high heat resistance of derived thermosets compared to similar hydroxyl-functional polyester of the prior art.

The viscosity of the hydroxyl-functional polyester resin prepared by the process of the process of the present invention ranges generally from about 100 mPa-s to about 200,000 mPa-s; preferably, from about 150 mPa-s to about 100,000 mPa-s; and more preferably, from about 200 mPa-s to about 50,000 mPa-s at 150° C.

The number average molecular weight ($M_n$) of the hydroxyl-functional polyester resin prepared by the process of the process of the present invention ranges generally from about 200 to about 100,000; preferably, from about 300 to about 80,000; and more preferably, from about 500 to about 50,000.

The hydroxyl-functional polyester resin of the present invention is useful as the epoxy component in a curable or thermosettable epoxy resin formulation or composition.

In another broad aspect of the present invention, a curable hydroxyl-functional polyester resin composition which may be suitable for a coating composition may be prepared comprising a mixture of: (i) the above described hydroxyl-functional polyester resin; (ii) at least one solvent; and (iii) at least one catalyst; and (iv) optionally, at least one curing agent and/or surfactant.

The first component (i) of the curable hydroxyl-functional polyester resin composition comprises the hydroxyl-functional polyester resin, as described above.

The concentration of the hydroxyl-functional polyester resin used in the curable hydroxyl-functional polyester resin mixture of the present invention may range generally from about 100 weight percent (wt %) to about 10 wt %; preferably, from about 99 wt % to about 20 wt %; and more preferably, from about 90 wt % to about 30 wt %. Generally, the amount of hydroxyl-functional polyester resin used is selected based on the desired balance of properties of the resulting cured product.

Also, to facilitate the curing of the divinylarene dioxide compound with the at least one curing agent, a solvent may be used in preparing the curable hydroxyl-functional polyester resin of the present invention. For example, one or more organic solvents well known in the art may be added to the hydroxyl-functional polyester resin composition. For example, aromatics such as xylene, ketones such as methyl ether ketone (MEK), and ethers such as diglyme; and mixtures thereof, may be used in the present invention.

The concentration of the solvent used in the present invention may range generally from 0 wt % to about 90 wt %, preferably from about 0.01 wt % to about 80 wt %, more preferably from about 1 wt % to about 70 wt %, and most preferably from about 10 wt % to about 60 wt %. Viscosity is too high or solvent is wasted when the above concentration ranges are not used.

In preparing the curable hydroxyl-functional polyester resin composition of the present invention, at least one curing catalyst may be used to facilitate the reaction of the divinylarene dioxide compound with the at least one curing agent. The curing catalyst useful in the present invention may include, for example, an acid such as phosphoric acid or an organosulfonic acid or a base such as a tertiary amine; and mixtures thereof.

The curing catalyst is generally employed in an amount of from about 0.01 to about 10, preferably from about 0.05 to about 5, and most preferably from about 0.1 to about 2, weight percent based on the combined weight of the hydroxyl-functional polyester resin and curing agent used.

An optional curing agent useful for the curable hydroxyl-functional polyester resin composition of the present invention may comprise any conventional curing agent known in the art for curing epoxy resins such as for example an epoxy resin, a phenolic resole, a melamine resin, and the like; and mixtures thereof.

For carboxy ester resins, the curing agent is preferably epoxy resins such as LER or SER. For example, D.E.R.® 331, D.E.R. 332, D.E.R. 334, D.E.R. 580, D.E.R. 661, D.E.R 664, D.E.R. 667, D.E.R. 669, D.E.N. 431, D.E.N. 438, D.E.R. 736, or D.E.R. 732 epoxy resins available from The Dow Chemical Company may be used. D.E.R. is a trademark of The Dow Chemical Company.

For epoxy ester resins, the curing agent is preferably a phenolic resole a melamine resin, or mixtures thereof.

The amount of the curing agent used in the curable hydroxyl-functional polyester resin composition generally is selected based on the desired balance of properties of the resulting cured product.

An optional surfactant useful for the curable hydroxyl-functional polyester resin composition of the present invention may comprise any conventional surfactant known in the art such as for example a silicone compound, a fluorinated organic compound, a polyether, and the like; and mixtures thereof.

The amount of the surfactant used in the curable hydroxyl-functional polyester resin composition generally ranges from about 0 wt % to about 10 wt %, preferably from about 0.01 wt % to about 2 wt %, and more preferably from about 0.1 wt % to about 1 wt %.

An assortment of known additives useful for the preparation, storage, and curing of hydroxyl-functional polyester resins may be used as optional additional components for the resin compositions of the present invention including for example, reaction catalysts, resin stabilizers, curing catalysts, processing aids, solvents, other resins, fillers, plasticizers, catalyst de-activators, and mixtures thereof.

In one embodiment, for example, a curable hydroxyl-functional polyester resin composition may comprise a reaction mixture of (i) an hydroxyl-functional polyester resin of a divinylarene dioxide and dicarboxylic acid as described above, (ii) at least one curing agent; (iii) at least one curing catalyst; and (iv) at least one other hydroxyl-functional polyester different from component (i).

In preparing the curable hydroxyl-functional polyester resin composition mixture of the present invention, in addition to the hydroxyl-functional polyester resin described above, the mixture may include at least one other epoxy resin, component (v). The optional epoxy resin may used as a comonomer for the epoxy ester resins of the present invention or the optional epoxy resin may used as a curing agent for carboxy ester resins of the present invention.

Optional epoxy resins include those compounds containing at least one vicinal epoxy group. The optional epoxy resin may be saturated or unsaturated, aliphatic, cycloaliphatic, aromatic or heterocyclic and may be substituted. The optional epoxy resin may also be monomeric or polymeric. The optional epoxy resin useful in the present invention may be selected from any known epoxy resins in the art. An extensive enumeration of epoxy resins useful in the present invention is found in Lee, H. and Neville, K., "Handbook of Epoxy Resins," McGraw-Hill Book Company, New York, 1967, Chapter 2, pages 257-307; incorporated herein by reference.

The optional epoxy resins, used in embodiments disclosed herein for component (v) of the present invention, may vary and include conventional and commercially available epoxy resins, which may be used alone or in combinations of two or more. In choosing epoxy resins for compositions disclosed herein, consideration should not only be given to properties of the final product, but also to viscosity and other properties that may influence the processing of the resin composition.

Particularly suitable optional epoxy resins known to the skilled worker are based on reaction products of polyfunctional alcohols, phenols, cycloaliphatic carboxylic acids, aromatic amines, or aminophenols with epichlorohydrin. A few non-limiting embodiments include, for example, bisphenol A diglycidyl ether, bisphenol F diglycidyl ether, resorcinol diglycidyl ether, triglycidyl ethers of para-aminophenols and mixtures thereof. Other suitable epoxy resins known to the skilled worker include reaction products of epichlorohydrin with o-cresol and phenol novolacs, respectively. It is also possible to use a mixture of two or more epoxy resins.

The optional epoxy resin useful in the present invention for the preparation of the curable epoxy resin composition may be selected from commercially available products. For example, D.E.R.® 331, D.E.R.332, D.E.R. 334, D.E.R. 580, D.E.R. 661, D.E.R 664, D.E.R. 667, D.E.R. 669, D.E.N. 431, D.E.N. 438, D.E.R. 736, or D.E.R. 732 epoxy resins available from The Dow Chemical Company may be used. As an illustration of the present invention, the epoxy resin component (a) may be a liquid epoxy resin, D.E.R. 383 epoxy resin having an epoxide equivalent weight (EEW) of 175-185, a viscosity of 9.5 Pa-s and a density of 1.16 gms/cc, or a solid epoxy resin, D.E.R 664 epoxy resin. Other commercial epoxy resins that can be used for the epoxy resin component can be D.E.R. 330, D.E.R. 354, or D.E.R. 332 epoxy resins.

Other suitable optional epoxy resins useful in the present invention are disclosed, for example, in U.S. Pat. Nos. 3,018,262, 7,163,973, 6,887,574, 6,632,893, 6,242,083, 7,037,958, 6,572,971, 6,153,719, and 5,405,688, PCT Publication WO 2006/052727; U.S. Patent Application Publication Nos. 20060293172, 20050171237, 2007/0221890 A1; each of which is hereby incorporated herein by reference.

In a preferred embodiment, the optional epoxy resin useful in the composition of the present invention comprises any aromatic or aliphatic glycidyl ether or glycidyl amine or a cycloaliphatic epoxy resin.

In general, the choice of the optional epoxy resin used in the present invention depends on the application. However, diglycidyl ether of bisphenol A (DGEBA) and derivatives thereof are particularly preferred. Other epoxy resins can be selected from, but limited to, for example; bisphenol F epoxy resins, novolac epoxy resins, glycidylamine-based epoxy resins, alicyclic epoxy resins, linear aliphatic epoxy resins, tetrabromobisphenol A epoxy resins, and combinations thereof.

The at least one optional epoxy resin, component (v), may be present in the epoxy resin mixture composition at a concentration ranging generally from about 1 wt % to about 99 wt %, preferably from about 10 wt % to about 90 wt %, and more preferably from about 25 wt % to about 75 wt %.

The curable or thermosettable composition of the present invention may optionally contain one or more other additives which are useful for their intended uses. For example, the optional additives useful in the present invention composition may include, but not limited to, stabilizers, surfactants, flow modifiers, pigments or dyes, matting agents, degassing agents, flame retardants (e.g., inorganic flame retardants, halogenated flame retardants, and non-halogenated flame retardants such as phosphorus-containing materials), toughening agents, curing initiators, curing inhibitors, wetting agents, colorants or pigments, thermoplastics, processing aids, UV blocking compounds, fluorescent compounds, UV stabilizers, inert fillers, fibrous reinforcements, antioxidants, impact modifiers including thermoplastic particles, and mixtures thereof. The above list is intended to be exemplary and not limiting. The preferred additives for the, formulation of the present invention may be optimized by the skilled artisan.

The concentration of the additional additives is generally between about 0 wt % to about 90 wt %; preferably, between about 0.01 wt % to about 80 wt %; more preferably, between about 1 wt % to about 65 wt %; and most preferably, between about 10 wt % to about 50 wt % based on the weight of the total composition. If no additive or a small amount of additive is used, the effect may be insignificant; or if an additive is used greater than 90 wt %, the amount of additive may be detrimental to thermoset properties.

The preparation of the curable hydroxyl-functional polyester resin composition of the present invention is achieved by admixing in a vessel the following components: the hydroxyl-functional polyester resin, a curing agent, optionally a catalyst, optionally another epoxy resin, and optionally an inert organic solvent; and then allowing the components to formulate into a hydroxyl-functional polyester resin composition. There is no criticality to the order of mixture, i.e., the components of the formulation or composition of the present invention may be admixed in any order to provide the thermosettable composition of the present invention. Any of the above-mentioned optional assorted formulation additives, for example fillers, may also be added to the composition during the mixing or prior to the mixing to form the composition.

All the components of the hydroxyl-functional polyester resin composition are typically mixed and dispersed at a temperature enabling the preparation of an effective epoxy resin composition having a low viscosity for the desired application. The temperature during the mixing of all components may be generally from about 0° C. to about 300° C. and preferably from about 20° C. to about 200° C.

The hydroxyl-functional polyester resin composition of the present invention, prepared from the divinylarene dioxides described above, have improved heat resistance compared to their BADGE analogs.

The viscosity of the hydroxyl-functional polyester resin composition prepared by the process of the present invention ranges generally from about 100 mPa-s to about 200,000 mPa-s; preferably, from about 150 mPa-s to about 100,000 mPa-s; and more preferably, from about 200 mPa-s to about 50,000 mPa-s at 150° C.

The number average molecular weight ($M_n$) of the hydroxyl-functional polyester resin composition prepared by the process of the present invention ranges generally from about 200 to about 100,000; preferably, from about 300 to about 10,000; and more preferably, from about 500 to about 5,000.

The heat resistance of the hydroxyl-functional polyester resin based thermoset of the present invention ranges generally from about 50° C. to about 300° C.; preferably, from about 75° C. to about 275° C.; and more preferably, from about 100° C. to about 250° C. as measured by the glass transition temperature ($T_g$) using differential scanning calorimetry (DSC).

The curable hydroxyl-functional polyester resin formulation or composition of the present invention can be cured under conventional processing conditions to form a thermoset. The resulting thermoset displays excellent thermo-mechanical properties, such as good solvent resistance.

The process to produce the thermoset products of the present invention may be performed by gravity casting, vacuum casting, automatic pressure gelation (APG), vacuum pressure gelation (VPG), infusion, filament winding, lay up injection, transfer molding, prepreging, dipping, coating, spraying, brushing, and the like.

The curing reaction conditions include, for example, carrying out the reaction under a temperature, generally in the range of from about 0° C. to about 300° C.; preferably, from about 20° C. to about 250° C.; and more preferably, from about 50° C. to about 200° C.

The pressure of the curing reaction may be carried out, for example, at a pressure of from about 0.01 bar to about 1000 bar; preferably, from about 0.1 bar to about 100 bar; and more preferably, from about 0.5 bar to about 10 bar.

The curing of the curable or thermosettable composition may be carried out, for example, for a predetermined period of time sufficient to cure the composition. For example, the curing time may be chosen between about 1 minute to about 24 hours, preferably between about 10 minutes to about 12 hours, and more preferably between about 100 minutes to about 8 hours.

The curing process of the present invention may be a batch or a continuous process. The reactor used in the process may be any reactor and ancillary equipment well known to those skilled in the art.

The cured or thermoset product prepared by curing the hydroxyl-functional polyester resin composition of the present invention advantageously exhibits a good solvent resistance. The cured product can be visually transparent or opalescent. The solvent resistance of the cured product may be demonstrated by MEK resistance as measured by ASTM D 5402-93 method. In general, the MEK resistance in terms of the number of double-rubs to failure may be from about 10 to greater than 200, preferably from about 20 to greater than 200 and more preferably from about 50 to greater than 200.

The hydroxyl-functional polyester resin compositions of the present invention are useful for the preparation of epoxy thermosets or cured products in the form of coatings, films, adhesives, laminates, composites, electronics, and the like.

As an illustration of the present invention, in general, the hydroxyl-functional polyester resin compositions of the present invention may be particularly suitable for several applications, such as electrical casting, electronic encapsulation, casting, molding, potting, encapsulation, tooling, injection molding, resin transfer molding, and the like. In one embodiment, the present invention may be used for the fabrication of hydroxyl-functional polyester resin based composites parts, particularly for producing large hydroxyl-functional polyester resin-based parts produced by casting, potting and encapsulation.

EXAMPLES

The following examples and comparative examples further illustrate the present invention in detail but are not to be construed to limit the scope thereof.

Example 1

Preparation of Epoxy Ester Resin from DVBDO and Isophthalic Acid (IPA)

A mixture of 5.14 grams of DVBDO (82.5 EEW, 0.062 equivalents), 5.0 grams of isophthalic acid (0.0.06 equivalents), 0.37 grams of tetraphenylphosphonium bromide and 31.6 grams of diethylene glycol dimethyl ether (diglyme) was charged to a 100 mL round bottom flask equipped with a condenser and a temperature controller. The white cloudy polymerization mixture became a clear solution at 140° C. The solution was further heated to 160° C. within 5 minutes, during which the mixture became cloudy. The flask contents were cooled to room temperature and then poured into a blender containing 500 mL of methanol in ice. The solvents were decanted off and the polymer was washed with 100 mL of methanol three times. The polymer was collected and dried overnight in a 75° C. vacuum oven to give a light-yellow hard solid having $T_g$=118° C. from DSC analysis and $M_n$=47,750 and $M_w$=93,100 from polystyrene calibrated gel permeation chromatography (GPC) measurement in dimethyl furan (DMF).

Comparative Example A

Preparation of Epoxy Ester Resin from D.E.R. 383 Epoxy Resin and Isophthalic Acid A mixture of 200 g. D.E.R. 383 epoxy resin and 84.9 g. isophthalic acid were allowed to react as described in WO 2008045894 to give an epoxy ester resin having $T_g$=77° C., $M_n$=6,670 and $M_w$=98,240.

Example 2

Coating Formulations and Evaluations

Coatings were prepared by mixing a coating resin, crosslinker (Methylon 75108 phenolic resole), catalyst (85% phosphoric acid), surfactant (BYK-310), and solvents (80/20 Dowanol EB/cyclohexanone) at 25 wt. % solid contents. The substrate used was tin free steel (TFS) panels. The coatings were prepared with a #20 draw down bar. The coated panels were stored in a dust free box for at least 30 minutes at room temperature (about 25° C.) before being cured in an oven at the temperature indicated below in Table I for 10 minutes.

The coating formulations and evaluation results of DVBDO-isophthalic acid resin are shown in the following Table I, together with the results from DER 669E.

TABLE I

| Resin | $H_3PO_4$[a] (ppH) | BYK-310 (ppH) | Baking Temp (° C.) | MEK DR[b] | $T_g$ (° C.) |
|---|---|---|---|---|---|
| epoxy ester (DVBDO/IPA) | 0.12 | 0.12 | 205 | >>200 | 234 |
| epoxy ester (DVBDO/IPA) | 0.12 | 0.12 | 180 | 175 | 234 |
| DER 669E | 0.12 | 0.12 | 205 | 50 | 83 |

[a]$H_3PO_4$ is a 85% solution, ppH is based on the calculated amount of 100% acid versus total coating solids.
[b]MEK double rub numbers to mar coating.

The invention claimed is:

1. A resin composition comprising the reaction product of (a) a divinylarene dioxide, (b) at least one dicarboxylic acid; and (c) a reaction catalyst; wherein the reaction product comprises a soluble hydroxyl-functional polyester resin product and wherein said soluble hydroxyl-functional polyester resin product remains soluble at a temperature of from about 100° C. to about 250° C.; wherein the soluble hydroxyl-functional polyester resin product is a precursor to forming a cured thermoset; and wherein the soluble hydroxyl-functional polyester resin product being cured forms a hydroxyl-functional polyester resin based thermoset having a heat resistance of from about 50° C. to about 300° C. as measured by glass transition temperature using differential scanning calorimetry.

2. The resin composition of claim 1, wherein the at least one divinylarene dioxide is in stoichiometric excess sufficient to form an epoxy ester resin.

3. The resin composition of claim 1, wherein the at least one dicarboxylic acid is in stoichiometric excess sufficient to form a carboxy ester resin.

4. The resin composition of claim 1, wherein the divinylarene dioxide comprises divinylbenzene dioxide, divinylnaphthalene dioxide, divinylbiphenyl dioxide, divinyldiphenylether dioxide, or mixtures thereof.

5. The resin composition of claim 1, wherein the divinylarene dioxide is divinylbenzene dioxide.

6. The resin composition of claim 1, wherein the concentration of the divinylarene dioxide ranges from about 1 weight percent to about 99 weight percent, and wherein the concentration of the dicarboxylic acid ranges from about 1 weight percent to about 99 weight percent.

7. The resin composition of claim 1, wherein the dicarboxylic acid comprises isophthalic acid, terephthalic acid, adipic acid, or mixtures thereof.

8. The resin composition of claim 1, wherein the reaction catalyst comprises ethyltriphenylphosphonium acetate-acetic acid complex; tetraphenylphosphonium bromide, 2-phenylimidazole; or mixtures thereof.

9. A curable hydroxyl-functional polyester resin composition comprising (i) at least one hydroxyl-functional polyester resin composition of claim 1; and (ii) at least one curing agent.

10. The curable composition of claim 9, wherein the concentration of said the hydroxyl-functional polyester resin ranges from about 10 weight percent to about 100 weight percent, and wherein the concentration of the curing agent ranges from about 0.01 weight percent to about to about 90 weight percent.

11. The curable composition of claim 9, wherein the curing agent comprises anhydrides, carboxylic acids, amine compounds, phenolic compounds, polyols, phenolic resoles, melamine resins, epoxy resins, or mixtures thereof.

12. The composition of claim 9, including a curing catalyst; wherein the curing catalyst comprises phosphoric acid; an organosulfonic acid; benzenesulfonic acid; toluenesulfonic acid; triethylamine; tripropylamine; tributylamine; 2-methylimidazole; benzyldimethylamine; 2-phenylimidazole; or mixtures thereof.

13. The composition of claim 12, wherein the concentration of the curing catalyst ranges from about 0.01 weight percent to about 20 weight percent.

14. A process for preparing a hydroxyl-functional polyester resin comprising reacting (a) a divinylarene dioxide, (b) at least one dicarboxylic acid; and (c) a reaction catalyst; to provide a soluble hydroxyl-functional polyester resin composition and wherein said soluble hydroxyl-functional polyester resin product remains soluble at a temperature of from about 100° C. to about 250° C.; wherein the soluble hydroxyl-functional polyester resin composition is a precursor to forming a cured thermoset; and wherein the soluble hydroxyl-functional polyester resin composition being cured forms a hydroxyl-functional polyester resin based thermoset having a heat resistance of from about 50° C. to about 300° C. as measured by glass transition temperature using differential scanning calorimetry.

15. A process for preparing a curable hydroxyl-functional polyester resin composition comprising admixing (i) the soluble hydroxyl-functional polyester resin of claim 1; and (ii) at least one curing agent.

* * * * *